A. PELESKEY.
MOVING SIDEWALK.
APPLICATION FILED APR. 2, 1921.
1,385,584.
Patented July 26, 1921.
2 SHEETS—SHEET 2.
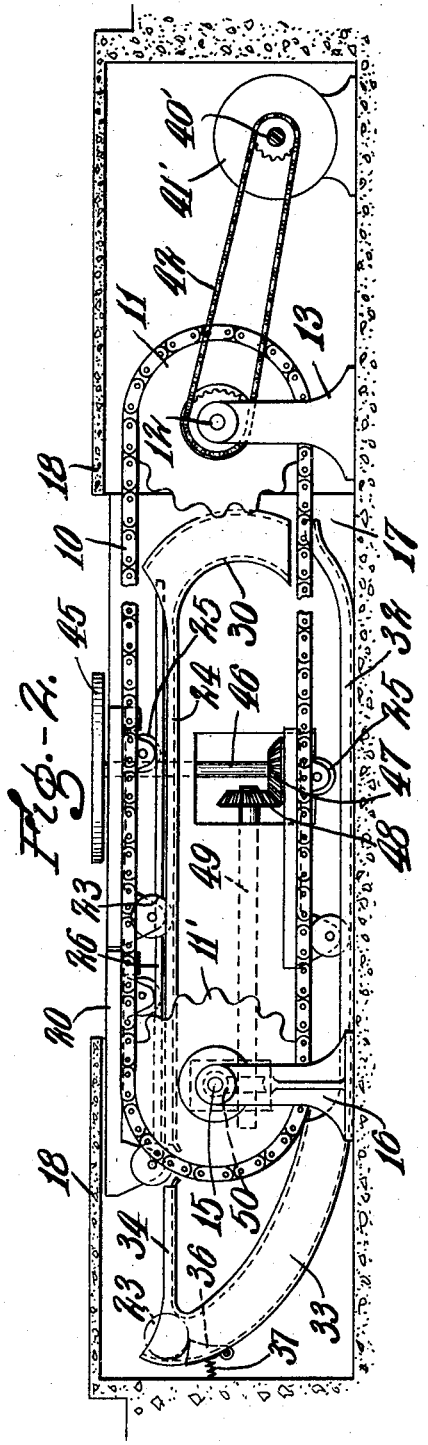
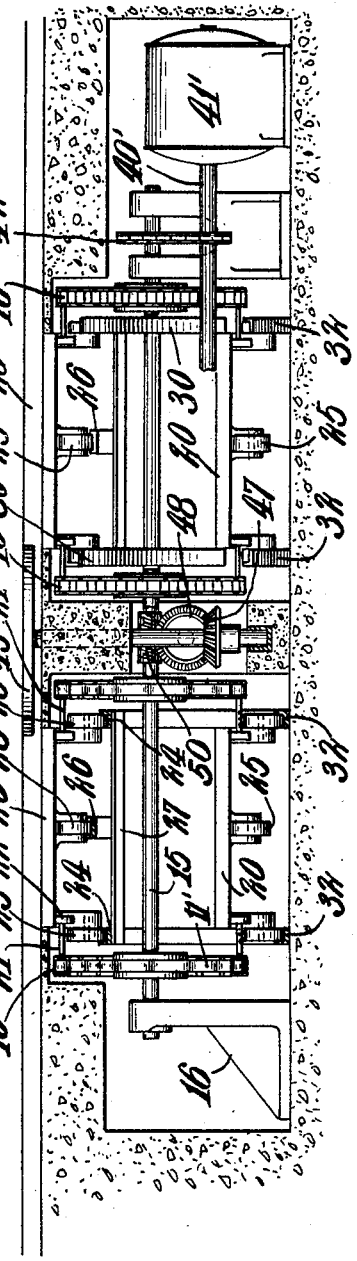
Inventor
Andrew Peleskey
By
Attorney

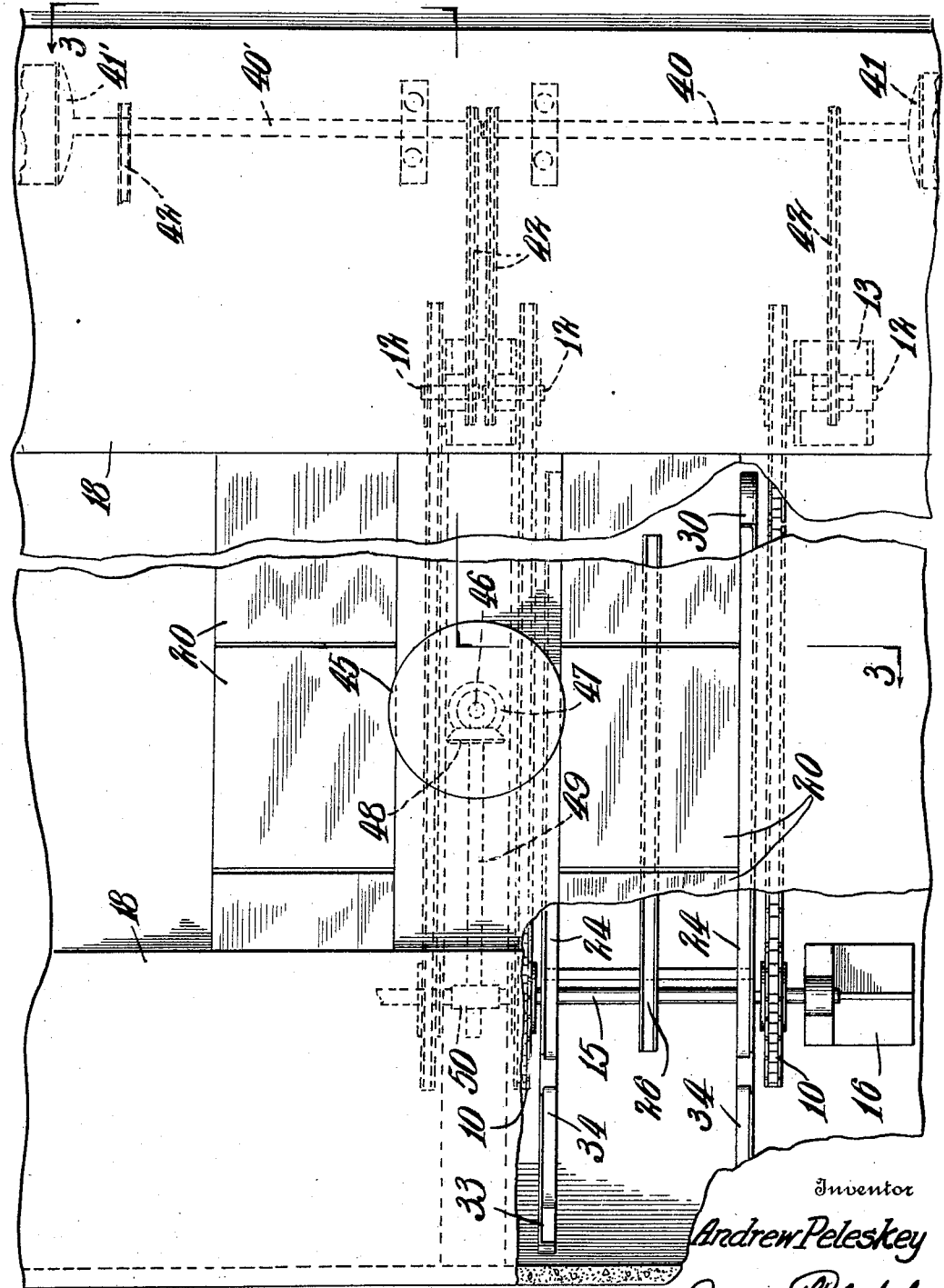

UNITED STATES PATENT OFFICE.

ANDREW PELESKEY, OF MARTINS FERRY, OHIO.

MOVING SIDEWALK.

1,385,584. Specification of Letters Patent. Patented July 26, 1921.

Application filed April 2, 1921. Serial No. 457,923.

*To all whom it may concern:*

Be it known that I, ANDREW PELESKEY, a citizen of Hungary, residing at Martins Ferry, in the county of Belmont and State of Ohio, have invented certain new and useful Improvements in Moving Sidewalks, of which the following is a specification.

This invention relates to a traveling sidewalk which may be employed as a street sidewalk or arranged between any two places for the transportation of people.

The invention has for an object to provide a novel and improved type of traveling sidewalk comprising adjacent units traveling in opposite directions and provided with novel means whereby the person using the sidewalk may change at certain points from one unit to the other.

A further object is to provide an improved arrangement for an endless sidewalk having comparatively long integral sections.

For further comprehension of the invention, and of the objects and advantages thereof, reference will be had to the following description and accompanying drawings, and to the appended claims in which the various novel features of the invention are more particularly set forth.

Figure 1 of the drawings is a plan view of a traveling sidewalk constructed according to the invention.

Fig. 2 is a side elevation thereof, showing the approaches and foundation in vertical section.

Fig. 3 is a transverse section on the broken line 3—3 of Fig. 1.

Briefly speaking, my improved traveling sidewalk comprises a pair of endless sidewalk elements arranged side by side and traveling in opposite directions, with transfer devices at suitable points.

As here shown each of the traveling elements comprises a pair of laterally spaced sprocket chains 10 looped, at opposite ends of the traveling walk, over sprocket wheels 11, 11'. These sprocket wheels are here shown as fixed respectively on stub shafts 12 journaled in standards 13, and a single transverse shaft 15 is journaled in standards 16. These chains 10, and the operating mechanism for the walks, are located in a suitable recess 17. Extending over the ends of the recess 17 and partially overhanging the sprocket wheels 11, 11' are fixed approaches 18.

The chains 10 carry a series of plates 20 which form the traveling surface on which the users stand. These plates are secured to the chains 10 at their forward ends to move therewith by means of pins 21 which project laterally from opposite sides of the plates and are engaged with the sprocket chains. The connection between the plates and chains is arranged to permit of relative swinging movement of the plates on the pins 21 as pivots, the plates being here shown as having bearing lugs 22 on their under side with which the ends of the pins are rotatively engaged.

At their rear ends the plates 20 are provided with wheels 23 which run upon tracks 24 extending longitudinally between the sprocket chains, the rear ends of the plates having no direct connection with the sprocket chains. The plates 20 may also each be provided with a single wheel 25 under their front ends which rests on a track 26 located midway between the tracks 24 on which the rear wheels 23 rest. These tracks 24 and 26 may be supported by any suitable framework, indicated generally at 27.

The sprocket chains 10, as is understood, are arranged in upper and lower oppositely moving reaches, the plates 20 running on the tracks 24 and 26 as they travel along the upper reaches in operative position.

Adjacent the end of the upper reach toward which the plates move, the tracks 24 verge into arcuate track elements 30 of channel cross section whose flanges engage the wheels 23 on diametrically opposite sides. The center rail 26 terminates at about the point where the arcuate elements 30 connect to the tracks 24. These arcuate elements 30 curve downwardly and then backwardly and terminate at their lower ends just above the lower reaches of the sprocket chains 10.

Extending backwardly along the flooring of the recess 17 are other tracks 32 on which the wheels 23 are adapted to run when the plates 20 are being carried backward with the lower reaches of the chains. These tracks terminate at the opposite end of the walk, that is the end from which it is moving, in channeled elements 33 which curve upwardly to unite with comparatively short track sections 34 alined with the tracks, these sections terminating at one side of the sprocket chains as they are carried around the adjacent sprocket wheels 11', while the tracks commence at the other side of the sprocket chains. This arrangement, as well as the spacing of the return track 32 from the arcuate element 30, is to allow the pins 21 to pass through the tracks, as they must do in their movement. Otherwise the track elements 24, 30, 32, 33 might be joined to form a continuous, unbroken track. Hinged at their lower ends to the upwardly curved track elements 33, adjacent their point of connection with the sections 34, are supports 36 which are moved outwardly as the wheels 23 pass the same, being automatically moved inward to form supports for said wheels 23 by means of springs 37.

For rotating the sprocket wheels 11, 11' I provide a pair of main drive shafts 40, 40' which may be driven in opposite directions by electric motors 41, 41' or otherwise and which extend transversely across one end of the walk. These shafts are adapted to be connected by suitable drive connections such as the sprocket chains 42 to the stub shafts 12 of the oppositely moving units to operate the same.

As previously stated transfer devices are arranged at suitable intervals along the sidewalk, only one of these transfer devices being shown. Each transfer device comprises a horizontally arranged disk 45 arranged between the oppositely moving units and projecting at its opposite edges over the edges of the plates of each unit. This disk is mounted on the upper end of a vertical shaft 46 having a bevel gear 47 on its lower end which meshes with a like gear 48 on the end of a horizontal shaft 49 driven by a worm drive 50 from the shaft 15. The disk is rotated in a direction to have its sides which overhang the respective units more in correspondence thereto.

It is believed the method of operation of my improved traveling sidewalk will be readily understood from the following description. The plates 20 are pulled forward in operative position by the chains 10 acting through the pins 21, the plates being supported on the tracks 24 and 26. When the end of the walk is reached the wheel 25 rides off the rail 26, and the wheels 23 engage the arcuate elements 30 just as the pins 21 are starting to move around with the sprocket wheels 11. The rear ends of the plates 20 thus move downward in substantial parallelism with the front ends and fall on the return tracks 32 and become the front ends as the plates are pushed backwardly by the chains. When the other end of the walk is reached the wheels 23 ride upon the rising track elements 33 while the pins 21 swing around the sprocket wheels 11'. The engagement of the supports 36 under the wheels 23 prevents the latter from riding down the track elements 33 as the pins commence to move forwardly, causing them to move onto the track sections 34. It will be understood of course that the arrangement of the track sections, and plates will be reversed for the oppositely moving units.

Having thus described my invention what I claim as new and desire to protect by Letters Patent of the United States is as follows:

1. A traveling sidewalk comprising a series of sprocket chain wheels over which said chains are looped in horizontally disposed upper and lower reaches, means pivotally attaching the plates at one end to the chains, upper and lower tracks supporting the other ends of the plates as they move forwardly and backwardly respectively, said tracks having curved sections at their ends adapted to maintain the plates in substantial parallelism as they reverse their direction of movement.

2. A traveling sidewalk comprising a series of sprocket chain wheels over which said chains are looped in horizontally disposed upper and lower reaches, means pivotally attaching the plates at one end to the chains, upper and lower tracks supporting the other ends of the plates as they move forwardly and backwardly respectively, said tracks having curved sections at their ends adapted to maintain the plates in substantial parallelism as they reverse their direction of movement, pins projecting from the said plates whereby they are connected to the said chains, said tracks being transversely split at certain points to permit of said pins passing through the same.

3. A traveling sidewalk, comprising a series of sprocket chain wheels over which said chains are looped in horizontally disposed upper and lower reaches, means pivotally attaching the plates at one end to the chains, upper and lower tracks supporting the other ends of the plates as they move forwardly and backwardly respectively, said tracks having curved sections at their ends adapted to maintain the plates in substantial parallelism as they reverse their direction of movement, and a spring actuated element on one of said curved sections adapted to support the plates as they reverse their direction of travel.

4. In a traveling sidewalk, a pair of adjacent units moving in opposite directions, and a horizontal transfer disk arranged between the two units and means for rotating said disk in a direction to cause its opposite sides to move in correspondence to the adjacent sidewalk units.

5. In a traveling sidewalk, a pair of adjacent units moving in opposite directions, and a horizontal transfer disk arranged between the two units, said disk having its peripheral edge overhanging the sides of the said units and means for rotating said disk in a direction to cause its opposite sides to move in correspondence to the adjacent sidewalk units.

In testimony whereof I have affixed my signature.

ANDREW PELESKEY.